United States Patent
Wang et al.

(10) Patent No.: US 10,308,856 B1
(45) Date of Patent: Jun. 4, 2019

(54) PASTES FOR THERMAL, ELECTRICAL AND MECHANICAL BONDING

(71) Applicant: The Research Foundation for The State University of New York, Binghamton, NY (US)

(72) Inventors: Hao Wang, Potomac, MD (US); Bahgat Sammakia, Binghamton, NY (US)

(73) Assignee: THE RESEARCH FOUNDATION FOR THE STATE UNIVERSITY OF NEW YORK, Binghamton, NY (US)

( * ) Notice: Subject to any disclaimer, the term of this patent is extended or adjusted under 35 U.S.C. 154(b) by 1027 days.

(21) Appl. No.: 14/211,783

(22) Filed: Mar. 14, 2014

Related U.S. Application Data

(60) Provisional application No. 61/786,893, filed on Mar. 15, 2013.

(51) Int. Cl.
*B23K 1/16* (2006.01)
*C09K 5/14* (2006.01)
*B23K 1/00* (2006.01)
*B23K 35/36* (2006.01)
*H01B 1/02* (2006.01)

(52) U.S. Cl.
CPC .............. *C09K 5/14* (2013.01); *B23K 1/0016* (2013.01); *B23K 35/36* (2013.01); *B23K 2001/12* (2013.01); *H01B 1/02* (2013.01)

(58) Field of Classification Search
CPC ........................................................ H01B 1/02
USPC ........................................................ 252/512
See application file for complete search history.

(56) References Cited

U.S. PATENT DOCUMENTS

| | | | |
|---|---|---|---|
| 3,767,519 A * | 10/1973 | Kojima | B29C 70/12 252/512 |
| 3,932,311 A * | 1/1976 | Caldwell | H01B 1/22 156/327 |
| 4,926,242 A | 5/1990 | Itoh et al. | |
| 5,393,568 A | 2/1995 | Valente et al. | |
| 5,785,535 A | 7/1998 | Brodsky et al. | |
| 6,015,301 A | 1/2000 | Brodsky et al. | |
| 6,183,874 B1 | 2/2001 | Yamagata et al. | |
| 6,388,273 B1 | 5/2002 | Yamagata et al. | |
| 6,524,758 B2 | 2/2003 | Eberlein et al. | |
| 6,534,190 B1 | 3/2003 | Yamagata et al. | |
| 6,579,652 B1 | 6/2003 | Detig et al. | |
| 6,815,130 B2 | 11/2004 | Eberlein et al. | |
| 6,882,045 B2 | 4/2005 | Massingill et al. | |
| 6,974,558 B2 | 12/2005 | Yamagata et al. | |
| 7,116,690 B2 | 10/2006 | Klimek | |

(Continued)

*Primary Examiner* — William D Young
(74) *Attorney, Agent, or Firm* — Tully Rinckey PLLC; Steven M. Hoffberg

(57) ABSTRACT

A class of paste materials for thermal, and mechanical bonding, and in some cases electrical interconnection, of two solid surfaces includes particles and an organic vehicle which is partially or completely removed during processing. The paste includes hybrids of inorganic materials for meeting the thermal, electrical and mechanical bonding functionality requirements and organic materials for meeting the process, application and protection requirements. The inorganic materials include high thermal and optionally electrical conductivity materials in forms from nanoparticles to micro-powders. The organic materials may include small molecules, surfactant, oligomers, and polymers.

20 Claims, 4 Drawing Sheets

(56) References Cited

U.S. PATENT DOCUMENTS

| | | | |
|---|---|---|---|
| 7,345,320 B2 | 3/2008 | Dahm | |
| 7,583,717 B2 | 9/2009 | Monty et al. | |
| 7,585,549 B2 | 9/2009 | Lewis et al. | |
| 7,742,311 B2 | 6/2010 | Liu | |
| 7,804,099 B2 | 9/2010 | Beeson et al. | |
| 7,863,641 B2 | 1/2011 | Dahm | |
| 7,989,839 B2 | 8/2011 | Dahm | |
| 8,029,903 B2 | 10/2011 | Gotoh et al. | |
| 8,066,967 B2 | 11/2011 | Eberlein et al. | |
| 8,129,001 B2 | 3/2012 | Wang et al. | |
| 8,138,075 B1 | 3/2012 | Eberlein et al. | |
| 8,268,437 B2 | 9/2012 | Gotoh et al. | |
| 8,297,767 B2 | 10/2012 | Tseng et al. | |
| 8,304,150 B1 | 11/2012 | Eberlein et al. | |
| 8,362,502 B2 | 1/2013 | Beeson et al. | |
| 8,403,536 B2 | 3/2013 | Oyaizu et al. | |
| 8,425,065 B2 | 4/2013 | Ravillisetty et al. | |
| 8,575,641 B2 | 11/2013 | Zimmerman et al. | |
| 8,593,817 B2 | 11/2013 | Bayerer et al. | |
| 8,610,263 B2 | 12/2013 | Hino et al. | |
| 8,823,035 B2 | 9/2014 | Livesay et al. | |
| 8,944,618 B2 | 2/2015 | Tseng et al. | |
| 9,033,531 B2 | 5/2015 | Ravilisetty et al. | |
| 9,057,499 B2 | 6/2015 | Livesay et al. | |
| 9,062,854 B2 | 6/2015 | Livesay et al. | |
| 9,099,575 B2 | 8/2015 | Medendorp, Jr. et al. | |
| 9,214,616 B2 | 12/2015 | Livesay et al. | |
| 2002/0034651 A1 | 3/2002 | Yamagata et al. | |
| 2002/0155661 A1 | 10/2002 | Massingill et al. | |
| 2005/0025654 A1 | 2/2005 | Yamagata et al. | |
| 2005/0153183 A1 | 7/2005 | Yoshitake et al. | |
| 2005/0231983 A1 | 10/2005 | Dahm | |
| 2005/0254539 A1 | 11/2005 | Klimek | |
| 2006/0014309 A1 | 1/2006 | Sachdev et al. | |
| 2007/0108585 A1 | 5/2007 | Pavier et al. | |
| 2007/0195839 A1 | 8/2007 | Monty et al. | |
| 2007/0226995 A1 | 10/2007 | Bone | |
| 2007/0246245 A1* | 10/2007 | Ahn | C08K 5/55 174/126.2 |
| 2008/0094841 A1 | 4/2008 | Dahm | |
| 2008/0253098 A1 | 10/2008 | Liu | |
| 2009/0029128 A1 | 1/2009 | Gotoh et al. | |
| 2009/0140272 A1 | 6/2009 | Beeson et al. | |
| 2009/0146117 A1* | 6/2009 | Suenaga | B22F 1/0062 252/520.3 |
| 2009/0283307 A1 | 11/2009 | Gotoh et al. | |
| 2010/0009071 A1* | 1/2010 | Chopra | B22F 1/0014 427/123 |
| 2010/0103680 A1 | 4/2010 | Oyaizu et al. | |
| 2010/0219736 A1 | 9/2010 | Dahm | |
| 2011/0018011 A1 | 1/2011 | Beeson et al. | |
| 2011/0075451 A1 | 3/2011 | Bayerer et al. | |
| 2011/0180809 A1 | 7/2011 | Hino et al. | |
| 2011/0182068 A1 | 7/2011 | Harbers et al. | |
| 2012/0002396 A1 | 1/2012 | Tseng et al. | |
| 2012/0087124 A1 | 4/2012 | Ravillisetty et al. | |
| 2012/0287623 A1 | 11/2012 | Tseng et al. | |
| 2012/0312692 A1 | 12/2012 | Kimura et al. | |
| 2013/0099264 A1 | 4/2013 | Zimmerman et al. | |
| 2013/0235556 A1 | 9/2013 | Ravilisetty et al. | |
| 2013/0319762 A1 | 12/2013 | Harris et al. | |
| 2013/0335989 A1 | 12/2013 | Sato et al. | |
| 2014/0061707 A1 | 3/2014 | Livesay et al. | |
| 2014/0225132 A1 | 8/2014 | Livesay et al. | |
| 2014/0226317 A1 | 8/2014 | Livesay et al. | |
| 2014/0268644 A1 | 9/2014 | Berben | |
| 2014/0327024 A1 | 11/2014 | Ishihara et al. | |
| 2014/0367703 A1 | 12/2014 | Livesay et al. | |
| 2014/0369030 A1 | 12/2014 | Livesay et al. | |
| 2014/0369031 A1 | 12/2014 | Livesay et al. | |
| 2015/0021628 A1 | 1/2015 | Medendorp, Jr. et al. | |
| 2015/0023023 A1 | 1/2015 | Livesay et al. | |
| 2015/0247619 A1 | 9/2015 | Ravilisetty et al. | |

* cited by examiner

PASTES FOR THERMAL, ELECTRICAL AND MECHANICAL BONDING

CROSS REFERENCE TO RELATED APPLICATION

The present application is a Nonprovisional and claims benefit of priority from U.S. Provisional Patent Application No. 61/786,893, filed Mar. 15, 2013, the entirety of which is expressly incorporated herein by reference.

FIELD OF THE INVENTION

The present invention relates to thermal interface paste materials.

BACKGROUND OF THE INVENTION

Development of less-expensive and high performance power electronic devices is essential to support commercialization of new technologies from integrating energy harvesting and storage devices to electric vehicles to solid state lighting to high power microelectronics. One of major technical barriers is the ability of materials and components for efficient thermal management. Thermal interface materials (TIMs) play an important role in enabling a wide range of power electronics because TIMs account for over 50% of the heat dissipation in most high power devices. Low thermal resistance TIMs that can work reliably at higher temperatures will greatly improve the performance and lifetime of power electronic. Conventional TIMs have performance and practical limitations in power electronics because of low thermal and electrical performance or poor thermo-mechanical reliability, or both. Current state-of-the-art TIMs using metals such as indium and its alloys can work up to 150° C., but they are fairly expensive, while raising their own reliability concerns.

Power dissipation in electronic devices is projected to increase significantly over the next ten years to 150 W/cm$^2$ and beyond for high performance applications (1). This increase in power represents a major challenge to systems integration since the maximum device temperature needs to be around 100° C. or higher. Typical thermal interface materials (TIMs) used in production today include thermal greases and adhesives, thermal gels, phase change materials, and low melt point solders such as indium (2). The thermal conductivity for these materials ranges from about 3 W/mK (grease and adhesives) to 50 W/mK (solders), which is not sufficient to meet the high-end demands in future electronics needs. Recently, high power LED lighting products have enjoyed rapid growth, renewing the need for thermal management solutions with right performance/cost tags. A higher junction temperature in LED chip reduces both the luminescence efficiency and the life span of LEDs, adding to the cost and threatening the viability of the technology (3). Development of suitable TIMs is important to support and facilitate the large LED lighting market. The key challenges in designing TIMs include material properties (matrix and filler of TIM pastes), interfacial resistances, and the assembly processes to achieve desirable thickness, composition, and bond strength.

Carbon nanotubes (CNTs) are promising new materials exhibiting extraordinary thermal properties to address thermal management challenge (4-6). Recent studies on both random CNT composites (7-9) and aligned CNT arrays (10-14) have shown less than ideal characteristics. There are significant challenges which include reducing structural defects in CNTs and lowering thermal resistance at filler/matrix and TIM/solids interfaces. Various approaches to address those issues using hybrid nanomaterials and interfacial engineering have been proposed (15).

Each of the following references is expressly incorporated herein by reference in its entirety:
1. National Electronics Manufacturing Initiative (NEMI) Roadmap, 2009.
2. Interface Material Selection and a Thermal Management Technique in Second-Generation Platforms Built on Intel® Centrino™ Mobile Technology, Intel Technology Journal, E. C. Samson et al., Vol. 9, Issue 1, pp. 75-86, February 2005
3. M. Arik, C. Becker, S. Weaver, J. Petroski, Third International Conference on Solid State Lighting, Proc. of SPIE Vol. 5187.
4. S. Berber, Y. K. Kwon, and D. Tomanek, Phys. Rev. Lett., vol. 84, pp. 4613-4617, 2000.
5. J. W. Che, T. Cagin, and W. A. Goddard, Nanotechnology, vol. 11, pp. 65-69, 2000.
6. P. Kim, L. Shi, A. Majumdar, and P. L. McEuen, Phys. Rev. Lett., 87, 215502, 2001.
7. S. U. S. Choi, et. al., Appl. Phys. Lett., 79, pp. 2252-2254, 2001.
8. M. J. Biercuk, et. al. Appl. Phys. Left., vol. 80, pp. 2667-2769, 2002.
9. S. T. Huxtable, et. al., Nature Mater., vol. 2, pp. 731-734, 2003.
10. Q. Ngo, et. al. Nano Lett., vol. 4, pp. 2403-2407, 2004.
11. J. Xu and T. S. Fisher, Int. J. Heat Mass Transf., vol. 49, pp. 1658-1666, 2006.
12. J. Xu and T. S. Fisher, IEEE Trans. Comp. Packg. Tech. vol. 29, pp. 261-267, 2006.
13. H. Huang, C. Liu, Y. Wu, S. Fan, Adv. Mater, 17, pp. 1652-1656, 2005.
14. Y. Wu, H. Huang, C. Liu, S. Fan, Appl. Phys. Lett. 87, 213108, 2005.
15. H. Wang, B. Sammakia, K. Yang, Y. Liu, U.S. Pat. No. 8,129,001 (2012).

SUMMARY OF THE INVENTION

The present technology employs composite silver, copper or other metal or alloy nanomaterials for use in TIMs. For example, Ag nanoflakes (Ag-NFs) and Ag nanoparticles (Ag-NPs), copper nanoparticles, are provided in TIM pastes. The nanomaterial-based TIM system may be optimized for both the bulk and interfacial thermal performances. Ag-NFs offer the promise of high bulk thermal conductivity whereas Ag-NPs provide the flexibility in interfacial engineering. Cu-nanoparticles are relatively immune to oxidation under mild conditions. In addition to thermal management applications, the technology can be used in general electronics packaging solutions that require high performance electronic and mechanical performances.

The present technology allows a TIM to be optimized for particular circumstances. In general, the larger particles provide high thermal conductivity, but alone may provide insufficient mechanical properties, such as ability to tolerate thermal cycling, hotspots, flexion, and the like. Likewise, the larger particles alone may not provide continuous thermal paths across the TIM. If the loading of large particles is too high, tolerance to mechanical stresses is impaired, and the layer thickness will tend to be thicker. If the loading of large particles is too low, then the thermal impedance will be high, Therefore, it is apparent that a balance of particles sizes is desired, to achieve optimum properties given the application.

The size distribution of the particles is preferably tight. This permits determination of critical conditions and crisp transitions, such as sintering temperature and pressure. Likewise, the use of tightly controlled materials facilitates reproducibility.

The present technology employs hybrids of intrinsically high thermal and electrical conductivity metallic micropowders and low-temperature sintering nanoparticles. Unlike conventional TIMs, most organic materials are removed in the functional TIM after processing, to leave only structured inorganic materials in the final assembly. They can withstand repeated temperature cycling between ambient temperatures (e.g., −20° C.) to ones exceeding 250° C. or 300° C., or cryogenic temperatures extending from −50° C. and ambient or temperatures up to about 250° C.

The present technology optimizes the particle size distribution to fill the voids between micropowder particles. Better internal contacts enhance the thermal transport performance, but mechanical reliability also should be considered.

The TIM according to the present technology may be used in power electronics, high density microelectronics, electric vehicles and vehicular electronics, solid state lighting, space and military applications, conventional and alternative energy management systems, thermal scavenger technologies, and household appliances such as heating and refrigeration system for efficiency enhancement.

In general, the TIM technology employs a hybrid of at least one, preferably two or more, inorganic materials, in the form of nanoparticulates, and at least one, preferably two or more, organic materials as a matrix. The inorganic material component is designed to meet the thermal, electrical and mechanical bonding functionality requirements of the TIM, and the organic materials component is designed to meet the process, application and protection requirements.

The inorganic materials include high thermal and electrical conduction nanostructured materials such as nanoparticles with the size 1-30 nm in diameter, nanowires with cross-section dimension of 1-30 nm and length of 0.1-30 μm, nanoplatelets with thickness of 1-30 nm and lateral dimension of 0.1-10 μm, and their combinations with variable compositions. The organic materials may include small molecule protection agents, solvents, polymers, and their combinations. The pastes have compositions of 20-90% inorganic content by mass and the rest organic content, depending on application and processing requirements. A majority portion to essentially all of the organic materials are removed in the final product for applications. The removal of organic materials occurs in two stages, (1) during the application and patterning stage, and (2) during the thermal compression bonding stage. The final assembled product can be used for applications that require stabile materials in the final product.

A particular embodiment provides silver nanoparticles which are about 4-6 nm in diameter and silver nanoflakes about 0.3-2 μm in lateral dimension. In general, the size distribution need not be so tightly controlled that the costs of production are inordinately increased. Thus, while a mean particle size may be 4-6 nm, the range may be, for example, 0.5-10 nm accounting for >90% on a weight basis. Smaller particles may have different physical properties, e.g. sintering, stability in the paste, oxidation, etc., while significant incidence of larger particles (other than those intended) may also alter the physical properties of the TIM during processing, and further may introduce inhomogeneities, size/pressure differences, that result in, for example, mechanical stress or poor interconnectedness of the particles. By constraining the particle and flake sizes, process conditions and costs can be better optimized, resulting in a superior TIM.

Pastes also contain three organic materials for balancing the competing requirements of the stability of nanoparticles, the dispersion of nanoparticulates in suspensions, the fluidity of the paste, and the rate of organic component removal. Upon the removal of organic components, the TIM layer consists of mainly Ag-NFs connected by sintered Ag-NPs as the primary heat passages. At the interfaces between TIM and solids (such as a die, circuit board or a heat sink), direct contacts between Ag-NFs and solids are not desirable because of the small contact area. Low interfacial thermal resistance is achieved by filling with mainly Ag-NPs, which bind both the solid surface and Ag-NFs upon sintering. It appears to be quite achievable for NFs loading of 30-50% by volume. Given bulk Ag thermal conductivity of about 430 W/mK, the bulk thermal conductivity of TIM could be in the range of 100 W/mK in the direction normal to the surface. It is possible that composites with higher loading of Ag-NFs be fabricated for high performance applications. In addition to using the paste in a conventional way of applying a thin layer bonding two solid surfaces, the paste layers can be patterned to optimize the need to address localized hotspots, stress handling, and materials saving.

As discussed above, silver has a high thermal conductivity, as well as reasonable sintering properties, and thus is preferred in many applications, except perhaps based on its cost. When cost is considered, other materials become attractive, such as for example, copper, or mixtures of copper and silver.

It is therefore an object to provide a hybrid paste providing good thermal, electrical and mechanical bonding, in a generally ready-for-application form, comprising: at least one nanostructured inorganic material and preferably more than one inorganic component including additional microstructured inorganic materials, which are designed and formulated for meeting the thermal, electrical and mechanical bonding functionality requirements; at least one organic material and preferably more than one organic material including small molecular solvents for dispersing the paste, a stabilizing agent for protecting the nanomaterials, plasticizers, oligomers and polymers, which are designed and formulated for meeting the dispersion, storage, process, application and protection requirements.

Another object provides a hybrid paste composition, comprising: a nanostructured inorganic material having particles having a dimension of about 1-30,000 nanometers, and a bulk thermal transfer coefficient of at least about of about 10 W/mK, which are sinterable at a temperature below about 450° C. to form an interconnected network; and at least one organic material effective for dispersing and stabilizing the particles within a flowable paste for application between two surfaces prior to heating to a temperature above at least 70° C., the at least one organic material being separable from the nanostructured inorganic material under heat at temperatures below about 450° C. and compression between the two surfaces; wherein after heating of the hybrid paste composition to a temperature between about 70° C. and 450° C. and compression, a sintered thermal interface material comprising an interconnected network configured to withstand a cyclic shear stress, e.g., of at least 2,000 cycles of thermal shock with temperature differences of at least 200° K, having at least 50% by weight inorganic material is formed, having a bulk thermal conductivity higher than about 10 W/mK.

A further object provides a thermal interface material having a thermal conductivity higher than about 10 W/mK, formed by a process comprising: providing flowable hybrid paste composition in a space between two surfaces, comprising a nanostructured inorganic material comprising particles having a dimension of about 1-30,000 nanometers, and a bulk thermal transfer coefficient of at least about of about 10 W/mK, which are sinterable at a temperature below about 450° C. to form an interconnected network configured to withstand a cyclic shear stress; and at least one organic material effective for dispersing and stabilizing the particles within the flowable paste for application between the two surfaces prior to heating to a temperature above at least 70° C.; applying a compression force of between about 1 N and 100,000 N between the surfaces, at a temperature between about 70° C. and 450° C. to remove at least a portion of the at least one organic material from the nanostructured inorganic material; sintering the particles to form an interconnected network between the two surfaces.

Another object provides a thermal interface having a thermal resistance between two surfaces with a thermal interface material in between, of less than about $10^{-5}$ m$^2$K/W, the thermal interface material having an inorganic component having a bulk thermal conductivity higher than about 10 W/mK, comprising sintered inorganic component particles derived from a hybrid organic-inorganic material paste, forming an interconnected network between the two surfaces configured to withstand a cyclic shear stress.

The particles may comprise: a first particle type having a size of about 100-30,000 nanometers, having a bulk thermal transfer coefficient in excess of about of about 10 W/mK; and a second particle type having a size of about 1-100 nanometers, having a bulk thermal transfer coefficient in excess of about of about 10 W/mK, the first particle type being sinterable in a presence of the second particle type, at a temperature below about 450° C. The first particle type may comprises at least 25% of the nanostructured inorganic material by mass or volume and the second particle type comprises at least 25% of the nanostructured inorganic material by mass or volume. Typically, volume measurements are relevant only of the density of the two types varies significantly. The nanostructured inorganic material preferably substantially excludes inorganic solids which interfere with sintering of the particles or heat transfer between the particles. The nanostructured inorganic material may comprise an alloy or solder having a sintering temperature at least 2° C. below that of at least one alloy component. The particles may each have a plurality of discrete particle regions, e.g., shells, each having different composition to form a regular composite.

The particles may have an at least bi-modal size distribution, a smallest size particle being nanoparticles having a size of 1-100 nm, 1-20 nm, or 1-5 nm, for example. The nanostructured inorganic material may comprise nanowires, e.g., having a cross section size of 1-30 nm, or 1-10 nm, and a length of 0.1-30 μm or 10-30 μm. The nanostructured inorganic material may comprise nano-platelets, having a thickness of 1-100 nm or 1-10 nm, and e.g., a size along an axis normal to a thinnest dimension of 0.1-20 μm or 0.1-10 μm. The particles may have an at least bi-modal size distribution, a largest size particle having a size of 1-30 μm or 1-10 μm. The particles may have a plurality of different compositions, either having the same size or different sizes.

The at least one organic material may comprise discrete stable domains of aggregated organic material suspended within an organic liquid, e.g., waxy particles. The at least one organic material may comprise at least one volatile component that substantially evaporates from a surface at a temperature of less than about 70° C. at pressures at or less than standard atmospheric pressure. The at least one organic material comprises a surfactant, and at least a portion of the surfactant may evaporate at temperatures in the range of 50° C. to 250° C. at pressures at or less than standard atmospheric pressure.

The particles may comprise nanoparticles which fuse together at temperatures between about 70° C. and 450° C. to form bigger particles having the same chemical type, or fuse with particles of the same or different size having different chemical composition.

The hybrid paste is preferably adapted to form a continuous network of fused particles filling a region between the two surfaces after compression and heating to temperatures between about 70° C. and 450° C. The continuous network of fused particles may form at least one of metallic and covalent contacts with the respective surfaces.

The compression of the two surfaces may be under an applied force of between about 1 N to 100,000 N. The compression may causes at least one of an extrusion of the at least one organic material from a region between the surfaces, a change in particle composition, a change of particle connectivity, and a contact between particles and a respective surface.

The sintered particles may form the interconnected network comprising at least 55% inorganic components by weight, e.g., between about 85-99% inorganic components by weight.

The bulk thermal conductivity may be higher than about 20 W/mK, 50 W/mK or 100 W/mK. The bulk electrical resistivity may be lower than about 50 μΩ·cm, 20 μΩ·cm, or 3 μΩ·cm.

The interconnected network preferably has a stable thermal conductivity characteristic for a static temperature between about −70° C. and 450° C., and/or stable thermal conductivity characteristics when cycled over a temperature range between −50° C. and 250° C., 0° C. and 250° C., and 20° C. to 300° C., for example. The interconnected network is preferably adapted to withstand a cyclic shear stress greater than about 5 MPa without persistent change in thermal conductivity.

The inorganic materials may include high thermal and/or electrical conduction materials such as silver, copper, tin, indium, gold, gallium, aluminum, silicon, boron, lithium, magnesium, palladium, carbon (graphite, nanotubes, fullerenes, diamond and diamond-like materials, amorphous), and their alloys and composites.

The inorganic materials take the form as follows:

nano-particulates, such as nanoparticles with the size of 1-100 nm in diameter, preferably 1-20 nm, and more preferably 1-5 nm;

nanowires with cross-section dimension of 1-30 nm, preferably 1-10 nm, and length of 0.1-30 μm, and more preferably 10-30 μm;

nano-platelets with thickness of 1-100 nm, preferably 1-10 nm, and a lateral dimension of 0.1-20 μm, preferably 1-10 μm;

micropowder particles with size of 1-30 μm in diameter, and preferably 1-10 μm;

bimodal or multi-modal distribution of particles of different sizes and chemical types; and all compositional combinations and subcombinations of the particles of different sizes and chemical types.

The organic materials may include small molecules, surfactants, oligomers, polymers, cross-linking agents.

The organic materials can take the form as follows:

small molecules of polar solvents, such as alcohols, sulfates, sulfoxides, acrylics, ketones, acetone, acetonitrile, etc.; nonpolar solvents, such as alkanes, cycloalkanes, alkenes, ethers, benzene and phenyl groups, etc.; solvents with intermediate polarity, such as acetates, furan, amines, etc.; and monomers with one or more unsaturated bonds;

surfactants with on ionic end-groups such as sulphonates, carboxylates, sulphates, amines, etc, or non-ionic end groups such as octoxynol, polyethylene glycol esters, carboxylic esters, carboxylic amides, etc.;

oligomers in different phase and morphology, with or without unsaturated bonds;

polymers in different phase and morphology, with or without unsaturated bonds; and all compositional combinations and subcombinations of the different chemical species.

The hybrid pastes may comprise 20-95% of inorganic content by mass, preferably 70-90% inorganics by mass, and the remainder as the organic content.

All or a portion of or all inorganic particulates may isolated from each other by surfactants.

The oligomers and polymers may be absorbed to or coated on the surface of inorganic particles, or uniformly distributed in organic solvents, or aggregated to form domains.

The distribution of various components in the paste preferably do not change over time over a period of at least two weeks, preferably one month, and even more preferably three months. Thus, preparation and use of the paste can be decoupled, and a ready-to-use paste provided.

The paste may be applied to the surface of joining parts, and thereafter lose at least a portion of its organic solvent molecules through evaporation, sublimation and extrusion to the environment, in ambient or in vacuum.

The paste may further lose solvent molecules and a portion of surfactants upon storage or processing at elevated temperatures in the range of about 50° C. to about 250° C.

The nanoparticles may fuse or sinter together to form larger particles or agglomerates of the same chemical type or heterogeneous type.

The nanoparticles may fuse with larger particles of the same or different chemical types to form even bigger particles.

The nanoparticles may fuse with bigger particles to form even bigger particles, which in part or in total can have different chemical compositions from the original particles.

The fused particles may have different spatial connectivity from prior to fusing inorganic particles.

The fused inorganic particles may form a continuous or generally continuous network in the entire gap region between the joining surfaces. The continuous or generally continuous network of fused inorganic particles may form metallic or covalent contacts with the joining surfaces.

The loss of organic component, change of particle compositions, change of particle connectivity and/or forming of contacts between two surfaces may be in part assisted by an applied force between joining surfaces, where the applied force can range from between about 1 N to about 100,000 N.

The paste that joins the two solid surface may comprises mostly inorganic materials, preferably 55-100% inorganics in mass, more preferably 85-99% inorganics in mass.

The TIM resulting from the paste (after removal of all or a portion of the inorganic components) may have a bulk thermal conductivity higher than 20 W/mK, preferably higher than 50 W/mK, more preferably higher than 100 W/mK.

The TIM resulting from the paste may have a bulk electric resistivity lower than 50 $\mu\Omega\cdot$cm, preferably lower than 20 $\mu\Omega\cdot$cm, more preferably lower than 3 $\mu\Omega\cdot$cm.

The TIM assembly resulting from the paste preferably can withstand a static temperature in the range of −70° C. to 450° C., whether the assembly itself is in the active use or in the idle state.

The TIM assembly resulting from the paste preferably can withstand cyclic temperature variations from −50° C. to 250° C. and/or 20° C. to 300° C.

The TIM assembly resulting from the paste preferably can withstand cyclic shear stress, e.g., greater than 0.2 MPa, 0.5 MPa, 1 MPa, 2.5 MPa, 5 MPa, 10 MPa, or 20 MPa.

The TIM assembly resulting from the paste preferably can withstand a tensile strength of 0.2 MPa, 0.5 MPa, 1 MPa, 2.5 MPa, 5 MPa, 10 MPa, or 20 MPa.

DETAILED DESCRIPTION OF THE PREFERRED EMBODIMENTS

Figure 4:
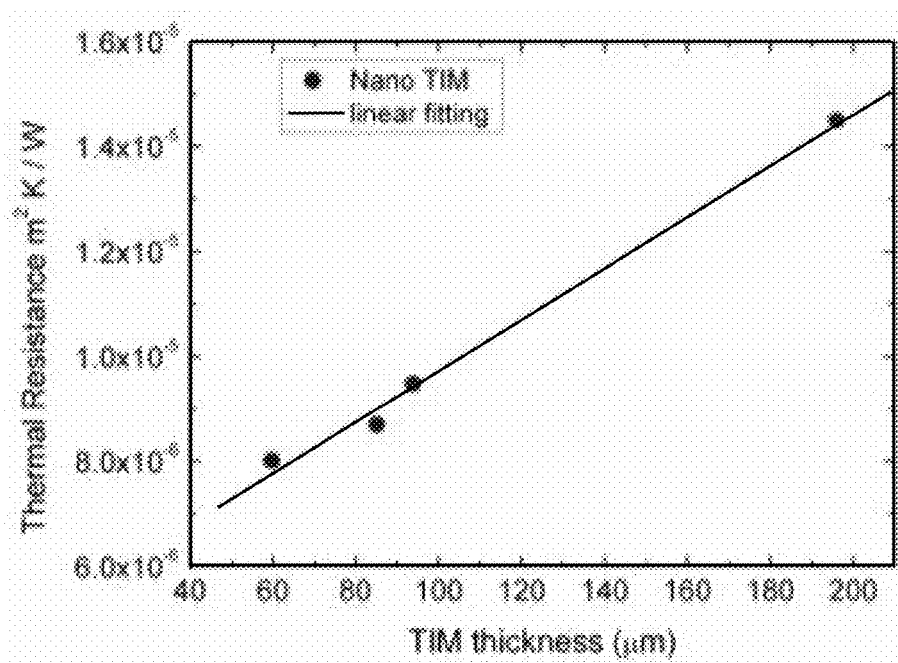
FIG. 4. Steady state thermal gradient measurements on nanopaste TIM showing interfacial thermal resistance of $2.4\pm0.2\times10^{-6}$ (m$^2$K/W) and bulk thermal conductivity of $20\pm1$ (W/mK).

FIG. 4 shows the steady state thermal gradient measurements on a microstructured nanopaste TIM showing interfacial thermal resistance of $2.4\pm0.2\times10^{-6}$ (m$^2$K/W) and bulk thermal conductivity of $20\pm1$ (W/mK), for silver nanoparticles having a flake size of about 100 nm-1 $\mu$m, and a thickness of 10's of nanometers.

Figure 1A:
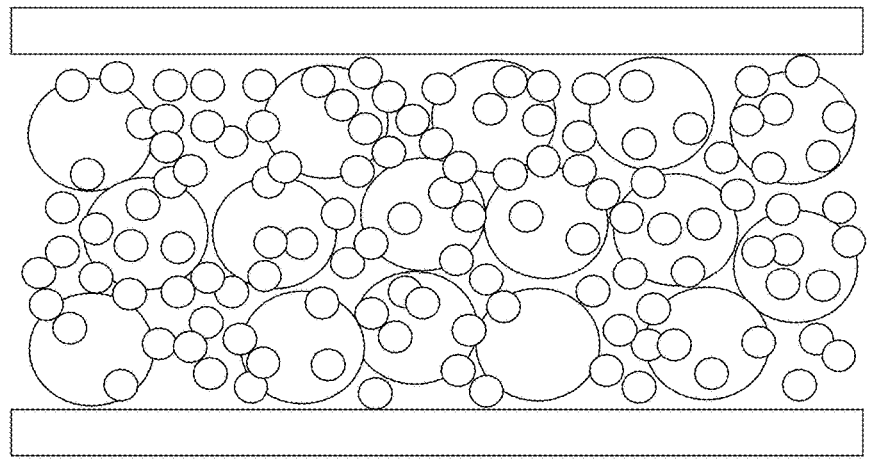
FIGS. 1A and 1B show schematic diagrams of the paste and formed TIM according to the present technology.
Figure 1B:
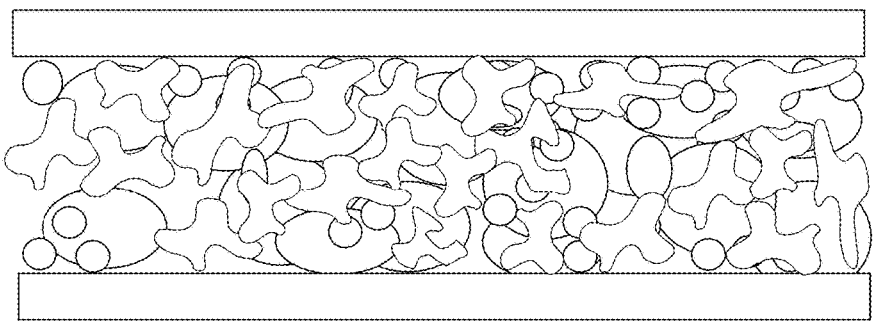

Tests prove the concept of Ag flake-particle combination nanopaste design and applications. For example, an LED's junction temperature has an impact on its luminescent efficiency. The test setup is shown in FIG. 1, which shows an LED array package on a heat sink, a photo detector to measure the luminescence, and a thermocouple to monitor junction temperatures. The power supply controls both the voltage and current to the 9 LED arrays, and maintains a constant power output at 7.4 W. Photo detector is fixed at a certain distance right above the LED lamp. Relative luminescence is calculated by normalizing the measured intensity to that at the initial time.

To maintain a well-defined surface and improve the adhesion with TIM, the back side of the as-received LED chip as well as the heat sink surface were coated with copper. The LED chip substrate was coated with a 100 nm Cu film by sputtering; while the heat sink was electroplated with 2.5 $\mu$m Cu. The performance of Ag nanocomposite TIMs was compared to that of a commercial thermal grease G-751.

Figure 2A:
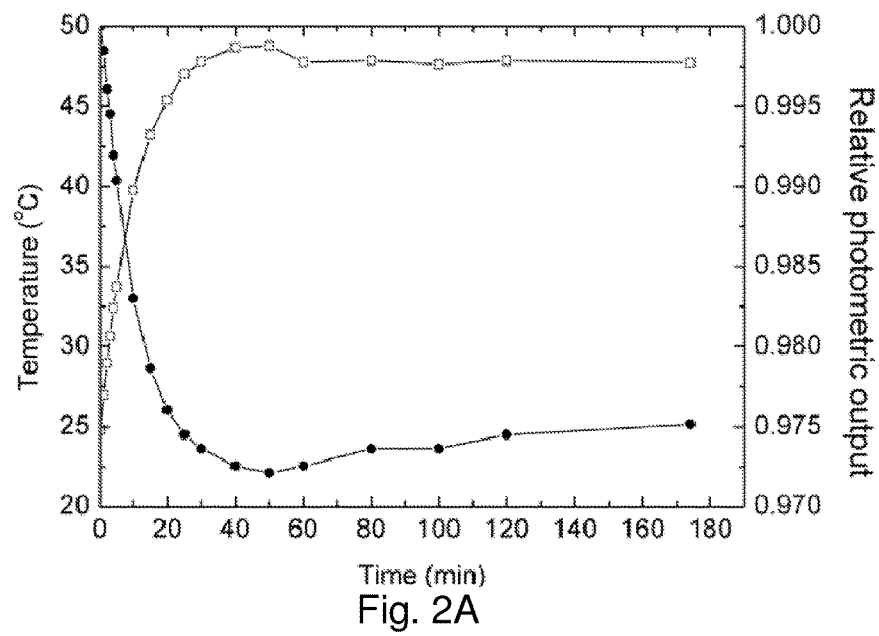
FIGS. 2A and 2B show the temperature and relative luminescence of LED/heat-sink package placed on paper box using thermal grease and Ag nanopaste TIMs, respectively.
Figure 2B:
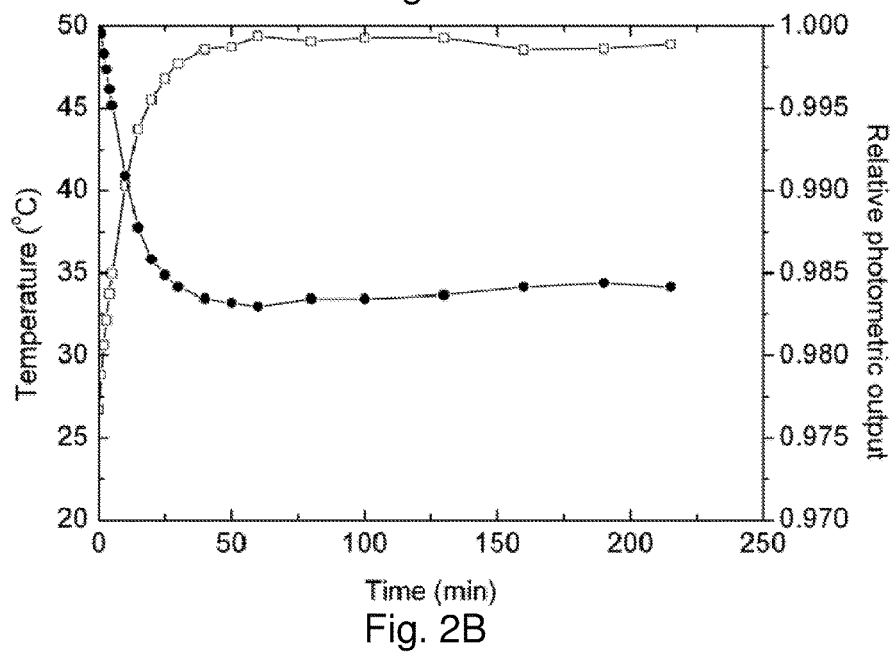

Tests on the LED package without any TIM were also carried out for comparison. The heat sink was placed on a paper box supported on a stainless steel optical table. The thickness of the TIM layer was 100 μm. Silver paste was applied between the LED board and the heat sink, and sintered at 200° C. for 1 hour under a 1.3 lb metal block. FIGS. 2A and 2B show the temperature and relative luminescence of LED/heat-sink package placed on paper box using G-751 thermal grease and Ag nanopaste TIMs, respectively.

Figure 3A:
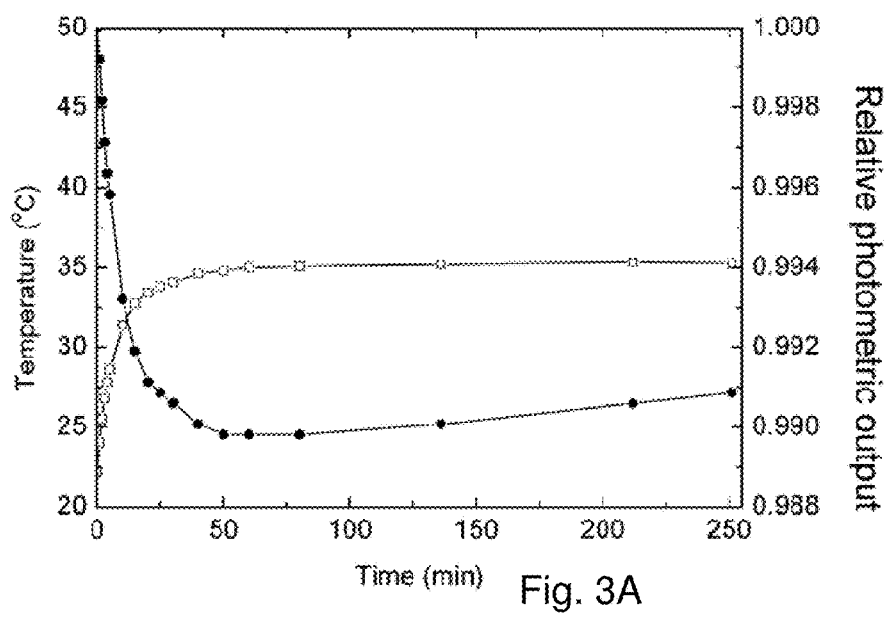
FIGS. 3A and 3B show the temperature and relative luminescence of LED/heat-sink package placed on an optical table using thermal grease and Ag nanopaste TIMs, respectively.
Figure 3B:
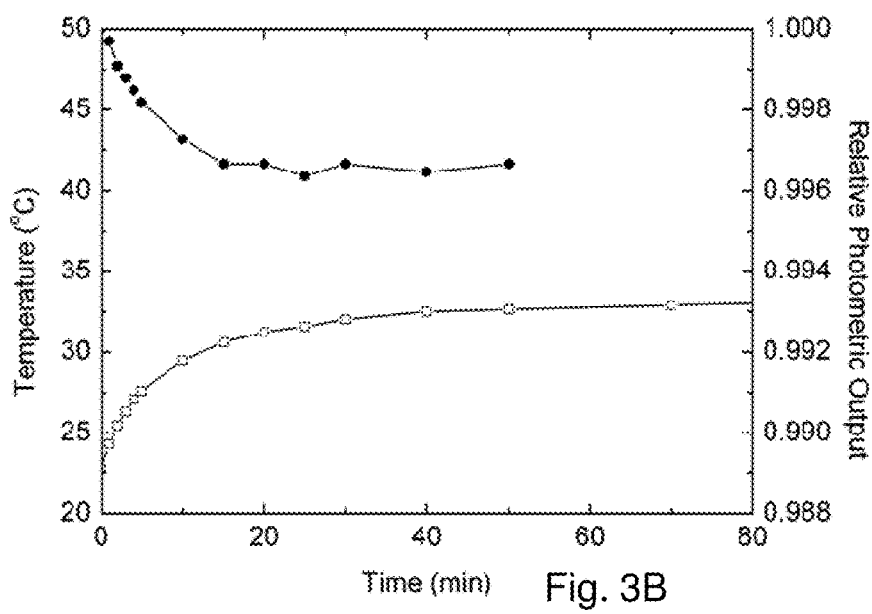

The TIM Ag paste includes silver nanoparticles which are about 4-6 nm in diameter and silver nanoflakes which are about 0.3-2 μm in lateral dimension. The LED board temperature goes up as the LED is turned on, and reaches a stable temperature in about 30 min; meanwhile relative luminescence drops to reach a relatively constant value. The total luminescence drops about 2.8% for thermal grease and about 1.5% for Ag paste, while in both cases the board reaches the final temperature at about 48° C., which is much lower than the 82° C. reached when no TIM was used. For LED packages placed directly on optical table, as shown in FIGS. 3A and 3B, however, the final temperature was about 35° C. for the G-751 thermal grease and about 33° C. for the Ag paste. Accordingly, the lighting efficiency dropped about 1% for the thermal grease and about 0.4% for the Ag paste.

The overall performance of composite silver TIMs according to the present technology is comparable to or slightly better than that of best thermal grease the inventors could find on the market, which has thermal conductivity of about 5 W/mK. The bulk thermal conductivity of sintered Ag paste according to the present technology was measured to be about 20 W/mK. The thermal resistance between the Ag TIM and Cu plates is $6 \times 10^{-6}$ m$^2$K/W, and the bond yield strength is 2 MPa.

So in principle, Ag-paste should be seen to perform much better. However, aforementioned values were obtained from Cu/Ag-paste/Cu sandwiches prepared by sintering at high pressure, at about 1000 psi. The LED sample described with respect to FIG. 2B was prepared with very low pressure, so the contacts may not be as tight and the bulk density not as high. Consequently, the TIM in LED pack has higher interfacial contact resistance and lower bulk thermal conductivity than possible through application of increased pressures during TIM formation.

More generally, a thermal resistance of less than $10^{-5}$ m$^2$K/W will be achieved according to the present technology, along with mechanical properties, such as an ability to withstand a cyclic shear stress, i.e., to handle shear without permanent deformation or flow. Traditional powders or pastes and liquids, cannot withstand shear forces. Solid interfaces (such as fused solder) may fail under temperature cycling or at extreme temperatures due an inability to accommodate forces resulting from thermal temperature coefficient mismatch, for example.

In another example, a low viscosity paste containing 20% silver nanoparticles in organic solvent is applied to a heated substrate. The paste is compatible with inkjet printing. Solvent is dried during the printing. The paste is sintered at 180° C. under pressure at the joint surfaces, during which the remaining organic content is evaporated. The specific thermal resistance is $1.4 \times 10^{-5}$ K/Wm$^2$, electric resistivity is 10 μΩ·cm, and yield strength of 2 MPa.

The base formulation of the Ag nanocomposite paste contains Ag-NFs and Ag-NPs as functional inorganic components and at least three organic materials for stabilization and dispersion of nanomaterials and the application of pastes in assembly. The relative composition of NFs and NPs, or the NF/NP ratio, may be used to optimize the thermal properties, process window, formulation recipe, and materials cost. By tuning the NF/NP ratio, the optimal parameters for specific applications can be achieved.

For example, in LED applications, the performance requirement bar may be lower, however, demands on cost and easy assembly is very high. The overall cost structure needs to consider not only the materials and manufacturing costs, but also the gains in operating luminescent efficiency and longer lifetime. In addition to NF/NP ratio, the wettability of the paste to solid substrates can be addressed by tailoring organic components in the paste. Although a general design principle according to the present technology is to remove all organic components after assembly, a certain level of organic residuals in the final product is tolerable, and these residuals may be functional.

Three parameters are generally important for process optimization: TIM bondline thickness, sintering temperature, and sintering time.

The thickness of the paste layer is adjusted according to the roughness of the solid surfaces (e.g., those of chip board and heat sink for LED packing, and those of lid, die or substrate in the case of high performance electronics packaging) so that upon being pressed between the solid surfaces, Ag pastes would fill all interfacial voids.

Because the paste formulation involves multiple organic components with different vapor pressure and boiling temperature, control of thermal annealing temperature and time profiles is important in the resulting TIM performance. Currently, pastes were annealed in two steps, a low temperature step (room temperature to 70° C.) to dry the low boiling temperature solvents, and a high temperature (130° C. to 200° C.) to remove remaining organic molecules. Optimal processing conditions vary with formulations. Because removal of the organic components reduces non-void volume, the TIM is applied in excess as compared to the final module.

Further process optimization also involves proper treatment of solid surfaces. In previous examples, Cu coating was used to improve the bond strength between the TIM and substrate. As direct bonding of Ag TIMs with Al is weak, reasonably strong bonding was achieved with an aluminum heat sink after acid treatment. In another approach, thin layers of Ag-NPs are deposited on both surfaces from a solution and sintered at 130° C. for 5 min to form a metallic Ag film. Subsequent application of Ag TIM paste therefore make good contact to the Ag pre-layer and conforms to the roughness features of the solid surfaces, intimately joining the two solid surfaces with high thermal conductivity passages.

With seamless metallic contacts and strong bonding, the assembly can sustain high operation temperatures without the need for the external pressure. One advantage of the TIMs is for high temperature application, especially since organics that might outgas and leave voids are removed during original TIM formation.

If localization of TIM application is needed, such as to address distributed singular hotspots over large areas, paste formulations may be provided to allow for inkjet printing of TIM layers. The inkjet may be of the piezoelectric kind, in which droplets are ejected by piezoelectric elements in narrow passages which generated pressure pulses, or of the bubblejet kind, in which a component of the fluid is boiled by a localized heating to eject TIM from a nozzle. The suspension for inkjet printing may include water or a low boiling point organic liquid, either of which will evaporate immediately after deposition in the pattern, leaving the organic matrix and inorganic silver nanoparticles and nanoflakes in the desired pattern.

An alternate scheme for depositing the TIM may involve electrographic deposition. See, U.S. Pat. Nos. 8,304,150, 8,138,075, 8,066,967, 7,585,549, 6,815,130, 6,579,652, and 6,524,758, expressly incorporated herein by reference. Note that the nanoparticles and/or nanoflakes may be formed as particles having an organic shell, which is degraded during heating and which facilitates sintering of the particle core.

Using any of a variety of printing techniques, TIM layers with carefully designed patterns (such as lines, grids, or pads) are deposited. The design criterion is to deliver an optimal amount of material to fulfill the thermal management requirement at minimal material usage with best thermo-mechanical stress tolerance. Excess material leads to larger interface distances and higher material cost and perhaps process cost, while insufficient material leads to voids and gaps. Thermo-mechanical stress tolerance is a distinct factor, which does not necessarily lead to a maximization or minimization of TIM thickness, and indeed, may lead to different TIM optimal thickness in various spatial regions of a complex TIM interface.

The morphology of TIM layer after assembly is a key that links formulation and processing parameters to the thermal, electrical, mechanical properties and performance.

In many instances, the TIM also serves a role as an electrical conductor. This has two impacts; the efficiency of the electrical device will be impacted by the electrical conductivity of the TIM, and electrical resistance of the TIM under load will lead to intrinsic heat dissipation. In both these instances, use of silver is advantageous, because it is highly conductive for heat and highly electrically conductive. Thus, for example, LED packages may use the lower surface as both an electrode and a heatsink.

The optimal formulation of the paste may encompass characterization of the individual components, as well as their interaction during processing to form the final TIM. That is, the silver nanoparticles, silver nanoflakes, and organic components of the paste are generally not defined independent of each other. Further, the paste may also include additional components. For example, the paste may include carbon nanotubes, particles of other metals, or the like. In most instances, precipitation of tin from an alloy and formation of tin whiskers is considered a liability; however, in a TIM, a carefully controlled and limited formation of crystalline structures may improve thermal, electrical, and/or mechanical performance. In some cases, the formation of crystalline precipitates from alloys may improve thermal, electrical, and/or mechanical properties of the interconnected network.

The structure, processing and property relationships may be further optimized by computer modeling to optimize the TIM formulation and properties for various uses.

A TIM design is provided in the form of solid films that integrate silver nanoflakes and silver nanoparticles. The paste formulation and process are optimized to minimize both the bulk and interfacial thermal resistances.

It is to be understood that the various embodiments described and taught herein are to be considered as if described in each possible combination, subcombination and permutation.

What is claimed is:

1. A hybrid paste composition, comprising:
   a nanostructured inorganic material having particles having a largest dimension of about 1-30,000 nanometers, and a bulk thermal transfer coefficient of at least about 10 W/mK, and being sinterable at a temperature below about 450° C. to form an interconnected network; and
   at least one organic material effective for dispersing and stabilizing the particles within a flowable paste for application between surfaces prior to heating to a temperature above at least 70° C., the at least one organic material separable from the nanostructured inorganic material under heat at temperatures below about 450° C. and compression between the surfaces;
   the hybrid paste composition being configured to form a sintered thermal interface material comprising an interconnected network of sintered inorganic material configured to withstand a cyclic shear stress of at least 0.2 MPa, and having at least 50% by weight inorganic material and a bulk thermal conductivity higher than about 10 W/mK, after heating of the hybrid paste composition to a temperature between about 70° C. and 450° C. and compression.

2. The composition according to claim 1, wherein the particles comprise:
   a first particle type having a size in each dimension of about 100-30,000 nanometers, having a bulk thermal transfer coefficient in excess of about 10 W/mK; and
   a second particle type having a size in each dimension of about 1-100 nanometers, having a bulk thermal transfer coefficient in excess of about 10 W/mK,
   the first particle type being sinterable in a presence of the second particle type, at a temperature below about 450° C.

3. The composition according to claim 2, wherein the nanostructured inorganic material comprises at least 25% by mass of the first particle type and the at least 25% by mass of the second particle type.

4. The composition according to claim 2, wherein the nanostructured inorganic material comprises at least 25% by volume of the first particle type and the at least 25% by volume of the second particle type.

5. The composition according to claim 1, wherein the hybrid paste composition is stable at room temperature in a ready-to-use form for at least 2 weeks.

6. The composition according to claim 1, wherein the particles comprise a material selected from the group consisting of copper, tin, indium, silver, gold, gallium, aluminum, silicon, boron, lithium, magnesium, palladium, and carbon.

7. The composition according to claim 1, wherein the nanostructured inorganic material comprises an alloy having a sintering temperature at least 2° C. below that of at least one component of the alloy.

8. The composition according to claim 1, wherein at least a portion of the particles are heterogeneous, having a plurality of discrete particle regions of a respective particle, each having different respective composition.

9. The composition according to claim 1, wherein the particles have an at least bi-modal size distribution, having first size nanoparticles having a size in each dimension of 1-100 nm and a second size particles having a size in each dimension of 1-30 µm.

10. The composition according to claim 9, wherein the first size nanoparticles and the second size particles have different chemical composition.

11. The composition according to claim 1, wherein the particles comprise nanowires having a cross section size of 1-30 nm and a length of 0.1-30 µm.

12. The composition according to claim 1, wherein the particles comprise nano-platelets having a thickness of 1-100 nm and a size along an axis perpendicular to a thinnest dimension of the platelet of 0.1-20 μm.

13. The composition according to claim 1, wherein the at least one organic material comprises at least one material selected from the group consisting of a surfactant, an oligomer, a polymer, a cross-linking agent, an alcohol, a sulfate, a sulfoxide, an acrylic, a ketone, acetone, acetonitrile, an alkane, a cycloalkane, an alkene, an ether, benzene, and an aromatic solvent.

14. The composition according to claim 1, wherein the at least one organic material comprises a solvent with a polarity intermediate between polar solvents and non-polar solvents, selected from the group consisting of an acetate, furan, an amine, and a monomer with one or more unsaturated bonds.

15. The composition according to claim 1, wherein the at least one organic material comprises at least one surfactant having an ionic end-group selected from the group consisting of a sulphonate, a carboxylate, a sulphate, an amine, octoxynol, a polyethylene glycol ester, a carboxylic ester, and a carboxylic amide.

16. The composition according to claim 1, comprising 20-95% by mass of the nanostructured inorganic material and 15-80% by mass of the organic material.

17. The composition according to claim 1, wherein the particles have a respective particle surface, and further comprise at least one of an oligomer and a polymer absorbed to the particle surface.

18. The composition according to claim 1, wherein the at least one organic material comprises discrete stable domains of aggregated organic material suspended within an organic liquid.

19. The composition according to claim 1, wherein the particles comprise nanoparticles having a first chemical composition and particles which are larger than nanoparticles having a second chemical composition, difference from the first chemical composition, the nanoparticles being fusible with the non-nanoparticles at temperatures between about 70° C. and 450° C.

20. A hybrid paste composition, comprising:

a nanostructured inorganic material comprising particles having a largest dimension of about 1-30,000 nanometers, and a bulk thermal transfer coefficient of at least about of about 10 W/mK, having a composition which is sinterable at a temperature below about 450° C. to form an interconnected network of the inorganic material; and at least one organic material effective for dispersing and stabilizing the particles within a flowable paste for application between surfaces prior to heating to a temperature above at least 70° C., the at least one organic material being separable from the nanostructured inorganic material under heat at temperatures below about 450° C. and compression between the surfaces;

the hybrid paste composition being configured, after being heated to a temperature between about 70° C. and 450° C. and compressed between surfaces, to form a sintered interconnected network of sintered inorganic material between the surfaces, configured to withstand a cyclic shear stress applied between the surfaces greater than about 5 MPa without persistent change in thermal conductivity, and having at least 50% by weight inorganic material and a bulk thermal conductivity higher than about 10 W/mK.

* * * * *